United States Patent Office 3,250,698
Patented May 10, 1966

3,250,698
AUTOFINING OF PETROLEUM HYDROCARBONS
Kenneth Shephard Cuddington and Ronald Lester, Sunbury-on-Thames, England, assignors to The British Petroleum Company Limited, London, England, a joint-stock corporation of Great Britain
No Drawing. Filed Sept. 25, 1963, Ser. No. 311,292
Claims priority, application Great Britain, Oct. 2, 1962, 37,272/62
8 Claims. (Cl. 208—214)

This invention relates to the autofining of petroleum naphthas to produce special boiling point solvents and white spirits.

Special boiling point solvents and white spirits are well known petroleum products. Special boiling point solvents (commonly referred to as SBP's) normally boil within the range 30–150° C. and white spirits within the range 150–200° C. and both are required to be doctor negative and of good odour and odour stability. Another requirement is that they should have a low content of aromatics and olefins. They are normally produced from straight run naphthas which have been refined by acid washing or by hydrofining (i.e. catalytic desulphurisation in the presence of added hydrogen). Another suitable refining technique is autofining which is particularly advantageous in situations where there is no readily available source of hydrogen. The autofining of naphthas is disclosed in U.K. Patent No. 654,152 and the autofining of kerosine and white spirits in U.K. Patent No. 669,536. Since a low content of aromatics is required in SBP's and white spirits a minimum production of aromatics during the antofining is desirable and this is achieved when autofining under equilibrium pressure conditions as disclosed in U.K. Patent No. 697,083.

Autofining catalysts are required to have activity for dehydrogenating naphthenes to aromatics and for hydrogenating organic sulphur compounds and to be resistant to the sulphur compounds present in the reaction zone. The catalyst normally used is cobalt and molybdenum oxides on alumina, but it has now been found that a precious metal catalyst may also be used.

According to the present invention, therefore, a process for the production of special boiling point solvents or white spirits comprises contacting a sulphur-containing straight run petroleum naphtha boiling within the range 30–200° C. with a catalyst comprising a platinum group metal on a refractory oxide support under equilibrium pressure autofining conditions, and recovering a doctor-negative product of acceptable odour and odour stability.

The catalyst comprising a platinum group metal on a refractory oxide support may conveniently be of the type normally used for the catalytic reforming of petroleum hydrocarbons. These may contain from 0.01–5% wt. of the platinum group metal, and preferably from 0.1 to 1% wt. The preferred platinum group metal is platinum. The refractory oxide support is preferably alumina, with, if desired, a minor proportion of an acidic activating component, for example from 1 to 40% wt., preferably 3 to 15% wt., of silica or from 0.1 to 8% wt. of fluorine and/or chlorine, preferably 0.1 to 2% wt.

Sulphur compounds will be present in the reaction zone during the autofining and it has been found that the catalyst will operate satisfactorily under these conditions. Preferably, however, the hydrogen sulphide produced is removed from the hydrogen-rich gas recycled to the reaction zone. This may be done, for example, by contacting with a sulphur-accepting solid, or by contact with a selective solvent, for example on amine solution as used in the well-known "Girbotol" process.

The sulphur in the feedstock to the autofining zone is preferably from 0.01 to 0.1% wt. and, more preferably from 0.01 to 0.05% wt. According to a particularly preferred embodiment of the invention, the feedstock, if containing sulphur in an amount in excess of that stated, is treated to remove the excess of sulphur prior to the autofining. This may conveniently be done by contacting the feedstock with a solid adsorbent, for example, natural or activated clay, or bauxite. A convenient treating rate may be within the range 0.1 to 4.0 liquid hourly space velocity, and suitable temperatures and pressures may be chosen, respectively, from the ranges 550 to 700° F. and 1 to 50 p.s.i.g.

The effect of removing a portion of the sulphur prior to the autofining is to alter the equilibrium pressure-temperature relationship allowing, for example, a higher equilibrium pressure at a given temperature, or a lower temperature at a given equilibrium pressure. Hydrogenation is favoured by higher pressures and/or lower temperatures and it is likely that this is a factor in the improved results. Besides increasing the ease with which doctor negative products and products with good odour and odour stability, are obtained, it may also be possible to dispense with a subsequent redistillation step. The precise amount of sulphur removed will depend on the sulphur content of the feed and the activity of the catalyst.

When operating under equilibrium pressure autofining conditions the temperature is likely to be within the range 550–820° F., particularly 700–800° F. and the pressure within the range 100–600 p.s.i.g., particularly 250–500 p.s.i.g. The space velocity may be from 0.1 to 10 v./v./hr., preferably 2–5 v./v./hr.

The present invention can be operated on a conventional platinum catalyst reformer without substantial modification of the plant. It is particularly suitable for use on the earlier low-severity reformers equipped with means for recycle gas scrubbing. It has also been found that a catalyst which has had extensive use for reforming can be used as the catalyst for the process of the present invention. In one siutation, for example, satisfactory results were obtained with a catalyst containing 0.3% wt. of platinum which had been used for reforming naphtha to an 80 research octane number level to an extent of 275 barrels of naphtha treated/lb. of catalyst.

As stated earlier, it may, in certain circumstances be possible to dispense with the conventional subsequent redistillation step for the removal of a small amount of bottoms, but the products may be subsequently fractionated as necessary to give the required boiling range solvents and white spirits. The commercial acceptability of the products may be determined in the normal manner, the sulphur content being normally assessed by the doctor test, which should be negative, and the odour and odour stability by comparison with a standard reference sample.

The invention is illustrated by the following examples:

EXAMPLE 1

*Preparation of special boiling point solvents*

A run was conducted in a plant normally used for platinum catalyst reforming which comprised a feedstock prefractionator column, three reformer reactors in series containing a platinum-alumina-halogen catalyst with 0.3% wt. platinum and 0.7% wt. of halogen a reactor products/ recycle gas separator, and products stabiliser column. The recycle gas stream was scrubbed with amine to remove hydrogen sulphide and, subsequently, with glycol to remove water in a conventional "Girbotol" unit. The platinum-alumina-halogen catalyst in this case had previously been used to process 275 barrels of naphtha/lb. of catalyst on normal catalytic reforming duty to an 80 research octane number level. The feedstock was a straight run naphtha which, after prefractionation, gave a reactor charge stock of 33 to 169° C. ASTM distillation range containing 0.067% wt. sulphur. The charge stock was autofined by passage through the reactor system under the equilibrium pressure operating conditions shown in Table 1 below to yield a stabilised, doctor test negative liquid product containing 0.0022% wt. sulphur. The stabilised product was distilled in a conventional continuous distillation unit to yield special boiling point solvents of the following grades: 60/90, 80/110, 100/140. Each of the solvent products had an odour similar to that of corresponding material which was known to be of commercially acceptable odour and the odour of each product was shown to be stable storage. Details of the properties of the reactor charge stock, the stabilised product and the special boiling products are given in Table 1.

TABLE 1

| Plant operating conditions: | |
|---|---|
| Reactor temperature, °F | 770 |
| Reactor pressure, p.s.i.g | 250 |
| Feed space velocity, v./v./hr | 3.0 |
| Recycle gas rate, s.c.f./bbl | 2,500 |
| Recycle gas hydrogen content, percent vol | 93 |

| Reactor charge and stabilised product properties: | Charge | Product |
|---|---|---|
| Specific gravity 15° C./4° C | 0.7050 | 0.7118 |
| ASTM distillation, °C.: | | |
| IBP | 33 | 39 |
| 5% vol. recovered at | 50 | 56 |
| 10% vol. recovered at | 58 | 62 |
| 50% vol. recovered at | 104 | 103 |
| 90% vol. recovered at | 145 | 144 |
| 95% vol. recovered at | 155 | 152 |
| FBP | 169 | 171 |
| Doctor test | | Negative |
| Total sulphur, percent wt | 0.061 | 0.0022 |
| Olefins, percent vol | 0.5 | 0.5 |
| Aromatics, percent vol | 4.5 | 6.5 |

| | 60/90 Grade | 80/110 Grade | 100/140 Grade |
|---|---|---|---|
| Redistilled SBP products: | | | |
| Specific gravity 15° C./4° C | 0.6755 | 0.7090 | 0.7360 |
| ASTM distillation IBP, °C | 58 | 83 | 103 |
| ASTM distillation FBP, °C | 79 | 108 | 137 |
| Olefins, percent vol | 0.5 | 0.5 | 0.5 |
| Aromatics, percent vol | 0.5 | 2.0 | 8.5 |
| Product odour compared with commercially acceptable corresponding material | Similar | Similar | Similar |
| Product odour stability | Stable | Stable | Stable |

EXAMPLE 2

*Preparation of special boiling point solvents*

A further run was conducted in the catalytic reformer plant described in Example 1 above. In this run, the raw feedstock was partially desulphurised prior to prefractionation by passage through a tower containing granulated clay at 625° F. at a liquid hourly space velocity of 0.8 v./v./hr. at 25 p.s.i.g. operating pressure. In this operation the sulphur content of the raw feedstock was reduced from 0.065% wt. to yield a reactor charge stock containing 0.014% wt. sulphur. This charge stock was autofined under the equilibrium pressure operating conditions shown in Table 2 below. The stabilised autofined product was doctor test negative and contained 0.0001% wt. sulphur. Special boiling point products obtained by fractionation of the stabilised autofined product were of similar odour to corresponding commercially acceptable materials and odour stable. Details of the properties of the reactor charge stock and the autofined products are given in Table 2. Comparison of the results attained in Examples 1 and 2 shows that prior desulphurisation of the reactor charge stock gave a substantially higher equilibrium autofining pressure at the same operating temperature (425 p.s.i.g. compared with 250 p.s.i.g. at 770° F.) and that a higher plant throughput of 4.3 v./v./hr. liquid hourly space velocity compared with 3.0 v./v./hr. was possible with the prior desulphurised charge stock.

TABLE 2

| Plant operating conditions: | |
|---|---|
| Reactor temperature, °F | 770 |
| Reactor pressure, p.s.i.g | 425 |
| Feed space velocity, v./v./hr | 4.3 |
| Recycle gas rate, s.c.f./bbl | 3,340 |
| Recycle gas hydrogen content, percent vol | 98 |

| Reactor charge and stabilised product properties: | Charge | Product |
|---|---|---|
| Specific gravity 15° C./4° C | 0.7135 | 0.7175 |
| ASTM distillation, °C.: | | |
| IBP | 47 | 55 |
| 5% vol. recovered at | 64 | 69 |
| 10% vol. recovered at | 70 | 74 |
| 50% vol. recovered at | 104 | 106 |
| 90% vol. recovered at | 138 | 142 |
| 95% vol. recovered at | 149 | 150 |
| FBP | 158 | 160 |
| Doctor test | | Negative |
| Total sulphur, percent wt | [1] 0.014 | 0.001 |
| Olefins, percent vol | 0.5 | 0.5 |
| Aromatics, percent vol | 6.0 | 6.5 |

| | 60/90 Grade | 80/110 Grade | 100/140 Grade |
|---|---|---|---|
| Redistilled SBP products: | | | |
| Specific gravity 15° C./4° C | | | |
| ASTM distillation IBP, °C | 62 | 82 | 102 |
| ASTM distillation FBP, °C | 80 | 106 | 138 |
| Olefins, percent vol | 0.5 | 0.5 | 0.5 |
| Aromatics, percent vol | 0.5 | 1.5 | 8.5 |
| Product odour compared with commercially acceptable corresponding material | Similar | Similar | Similar |
| Product odour stability | Stable | Stable | Stable |

[1] Feedstock partly desulphurised from 0.065 to 0.014% wt. sulphur by passage over activated clay at 625° F., 0.8 v./v./hr., 25 p.s.i.g. pressure.

EXAMPLE 3

*Preparation of white spirit*

A run was conducted in the catalytic reformer plant described in Example 1 in which a straight run naphtha feedstock containing 0.148% wt. sulphur was passed through the clay tower to give a reactor charge stock containing 0.072% wt. of sulphur. The reactor charge stock was autofined under equilibrium pressure conditions to yield a stabilised product which was doctor test negative, contained 0.0002% wt. sulphur and had an odour similar to that of a corresponding commercially acceptable white spirit. The odour of the autofined product was stable in storage. Details of the processing conditions and the properties of the reactor charge stock and stabilised product are given in Table 3 below.

TABLE 3

| Plant operating conditions: | |
|---|---|
| Reactor temperature, °F | 795 |
| Reactor pressure, p.s.i.g | 425 |
| Feed space velocity, v./v./hr | 3.0 |
| Recycle gas rate, s.c.f./bbl | 4,950 |
| Recycle gas hydrogen content, percent vol | 97 |

| Reactor charge and stabilised product properties: | Charge | Product |
|---|---|---|
| Specific gravity 15° C./4° C | 0.7775 | 0.7785 |
| ASTM distillation, °C.: | | |
| IBP | 150.5 | 153 |
| 5% vol. recovered at | 157 | 157 |
| 10% vol. recovered at | 158.5 | 158.5 |
| 50% vol. recovered at | 166 | 166 |
| 90% vol. recovered at | 177 | 177.5 |
| 95% vol. recovered at | 182 | 182.5 |
| FBP | 188 | 200 |
| Doctor test | Positive | Negative |
| Total sulphur, percent wt | [1] 0.072 | 0.0002 |
| Olefins, percent vol | 0.5 | 1.0 |
| Aromatics, percent vol | 18.0 | 19.5 |

| Product odour compared with commercially acceptable corresponding material | Similar |
|---|---|
| Product odour stability | Stable |

[1] Feedstock partly desulphurised from 0.148 to 0.072% wt. sulphur by passage over activated clay at 650° F., 0.6 v./v./hr., 25 p.s.i.g. pressure.

EXAMPLE 4

A further run was conducted in the catalytic reformer plant described in Example 1 above in which a straight run naphtha feedstock containing 0.115% wt. sulphur was treated in the clay tower to give a reactor charge stock containing 0.034% wt. sulphur. The reactor charge stock was autofined under equilibrium pressure conditions to yield a stabilised product which was doctor test negative, contained 0.0001% wt. sulphur and had an odour similar to that of a corresponding commercially acceptable white spirit. The odour of the autofined product was stable in storage. Details of the processing conditions and the properties of the charge stock and stabilised product are given in Table 4 below. Comparison of the results obtained in Examples 3 and 4 shows that prior desulphurisation of the reactor charge stock to a lower sulphur level enables an equilibrium autofining operating pressure of 425 p.s.i.g. to be obtained at a lower reactor temperature (780° F. compared with 795° F.) under otherwise similar processing conditions.

TABLE 4

| Plant operating conditions: | | |
| --- | --- | --- |
| Reactor temperature, °F | | 780 |
| Reactor pressure, p.s.i.g | | 425 |
| Feed space velocity, v./v./hr | | 3.0 |
| Recycle gas rate, s.c.f./bbl | | 4,750 |
| Recycle gas hydrogen content, percent vol | | 98 |

| Reactor charge and stabilised product properties: | Charge | Product |
| --- | --- | --- |
| Specific gravity 15° C./4° C | 0.7775 | 0.7785 |
| ASTM distillation, °C.: | | |
| IBP | 152 | 149 |
| 5% vol. recovered at | 159 | 157 |
| 10% vol. recovered at | 161 | 159 |
| 50% vol. recovered at | 168 | 167 |
| 90% vol. recovered at | 179 | 180 |
| 95% vol. recovered at | 183 | 185 |
| FBP | 189 | 194 |
| Doctor test | | Negative |
| Total sulphur, percent wt | ¹ 0.034 | 0.0001 |
| Olefins, percent vol | 0.5 | 0.5 |
| Aromatics, percent vol | 17.5 | 20.5 |

| | |
| --- | --- |
| Product odour compared with commercially acceptable corresponding material | Similar |
| Product odour stability | Stable |

¹ Feedstock partly desulphurised from 0.115 to 0.034% wt. sulphur by passage over activated clay 625° F., 0.6 v./v./hr., 25 p.s.i.g. pressure.

We claim:

1. A method of catalytically converting a sulphur containing feedstock consisting essentially of a straight run petroleum naphtha boiling within the range of 30° C. to 200° C. to a specialty product selected from the group consisting of specialty boiling point solvents and white spirits having commercially acceptable odor, and odor stability and being doctor-negative, comprising contacting the naphtha under autofining conditions of equilibrium pressure and a temperature of from 550° F. to 820° F. in the presence of a catalyst comprising from 0.01% to 5% by weight of a platinum group metal on a refractory oxide support.

2. A process as claimed in claim 1 wherein the refractory oxide support is alumina.

3. A method as in claim 1 wherein the sulphur content of the naphtha is initially in excess of the range of 0.01% to 0.1% by weight and is reduced to within the range of 0.01% to 0.1% by weight before exposure to autofining conditions.

4. A process as claimed in claim 1 wherein the feedstock contains from 0.01 to 0.05% wt. of sulphur.

5. A process as claimed in claim 1 wherein the initial feedstock is contacted, prior to the autofining, with a solid adsorbent.

6. A process as claimed in claim 5 wherein the solid adsorbent is clay.

7. A process as claimed in claim 1 wherein the autofining temperature is from 700 to 800° F.

8. A process as claimed in claim 1 wherein the autofining equilibrium pressure is from 100 to 600 p.s.i.g.

References Cited by the Examiner

UNITED STATES PATENTS

| | | | |
| --- | --- | --- | --- |
| 2,672,433 | 3/1954 | Porter et al. | 208—214 |
| 2,749,282 | 6/1956 | Porter et al. | 208—214 |
| 2,771,400 | 11/1956 | Porter et al. | 208—214 |
| 2,888,397 | 5/1959 | Burton et al. | 208—217 |
| 2,890,165 | 6/1959 | Bednars et al. | 208—217 |

DELBERT E. GANTZ, *Primary Examiner.*

S. P. JONES, *Assistant Examiner.*